US009704056B2

(12) United States Patent
Govil

(10) Patent No.: US 9,704,056 B2
(45) Date of Patent: Jul. 11, 2017

(54) COMPUTING HIERARCHICAL COMPUTATIONS FOR COMPUTER VISION CALCULATIONS

(71) Applicant: QUALCOMM Incorporated, San Diego, CA (US)

(72) Inventor: Alok Govil, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/861,968

(22) Filed: Sep. 22, 2015

(65) Prior Publication Data

US 2016/0292530 A1 Oct. 6, 2016

Related U.S. Application Data

(60) Provisional application No. 62/142,336, filed on Apr. 2, 2015.

(51) Int. Cl.
*G06K 9/46* (2006.01)
*G06T 5/20* (2006.01)
*G06T 5/40* (2006.01)

(52) U.S. Cl.
CPC ......... *G06K 9/4614* (2013.01); *G06K 9/4642* (2013.01); *G06T 5/20* (2013.01); *G06T 5/40* (2013.01); *G06T 2207/20192* (2013.01)

(58) Field of Classification Search
CPC .. G06K 9/4614; G06K 9/4642; G06K 9/4647; G06K 9/4638; G06K 9/6219;
(Continued)

(56) References Cited

U.S. PATENT DOCUMENTS 5,022,091 A * 6/1991 Carlson ................... G06T 5/002
382/240
5,280,547 A * 1/1994 Mahoney ............. G06K 9/4638
382/226
(Continued)

FOREIGN PATENT DOCUMENTS

CN 102663409 A 9/2012
DE 102006023611 A1 11/2007
(Continued)

OTHER PUBLICATIONS

Delbruck, T., et al., "Activity-Driven, Event-Based Vision Sensors," Proceedings of 2010 IEEE International Symposium on Circuits and Systems (ISCAS), 2010, 4 pages.
(Continued)

*Primary Examiner* — Jingge Wu
(74) *Attorney, Agent, or Firm* — Kilpatrick Townsend & Stockton, LLP

(57) ABSTRACT

Methods, systems, computer-readable storage media, and apparatuses for efficiently computing a computer vision operation are presented. In certain aspects, techniques are disclosed for receiving values from one or more pixels from a pixel array and representing those values for facilitating computer vision operations, such as Haar-like feature computations. In one implementation, the pixel values are represented as a hierarchy of computations; each level above the lower level of the hierarchy of computations comprises one or more values representing a computation of the values from a lower level of the hierarchy. The computation can include a simple sum of the values for the lower level of the hierarchy, a weighted sum of the values for the lower level of the hierarchy, an average of the values for the lower level of the hierarchy, a local binary pattern based on the values for the lower level of the hierarchy, a histogram of oriented gradients based on the values for the lower level of the (Continued)

hierarchy, or other computer vision feature computation based on the values for the lower level of the hierarchy. In such an implementation, the computer vision operations, such as Haar-like feature computations, may be performed using the hierarchy of averages.

30 Claims, 8 Drawing Sheets

(58) Field of Classification Search
CPC ........ G06K 9/4609; G06T 2207/20016; G06T 5/20; G06T 5/40
See application file for complete search history.

(56) References Cited

U.S. PATENT DOCUMENTS

| | | | |
|---|---|---|---|
| 5,543,590 A | | 8/1996 | Gillespie et al. |
| 5,808,690 A * | | 9/1998 | Rich ................ G06F 15/8007 345/505 |
| 6,011,257 A | | 1/2000 | Endoh |
| 6,195,463 B1 * | | 2/2001 | Kondo ................ G06T 1/20 382/240 |
| 6,738,424 B1 * | | 5/2004 | Allmen ................ G06T 9/001 375/240.08 |
| 7,010,163 B1 * | | 3/2006 | Weiss ................ G06T 5/20 382/168 |
| 7,038,185 B1 | | 5/2006 | Tumblin et al. |
| 7,151,844 B2 | | 12/2006 | Stevenson et al. |
| 8,385,671 B1 * | | 2/2013 | Batur ................ G06T 5/002 382/254 |
| 8,462,996 B2 | | 6/2013 | Moon et al. |
| 8,902,971 B2 | | 12/2014 | Pace et al. |
| 8,928,793 B2 | | 1/2015 | McMahon |
| 2001/0028405 A1 | | 10/2001 | Kondo et al. |
| 2004/0062420 A1 * | | 4/2004 | Rohaly ................ G01P 5/001 382/107 |
| 2004/0155175 A1 | | 8/2004 | McNulty |
| 2008/0240603 A1 * | | 10/2008 | Zhou ................ H04N 5/217 382/266 |
| 2009/0020612 A1 | | 1/2009 | Drzymala et al. |
| 2009/0157707 A1 | | 6/2009 | Ito et al. |
| 2010/0042938 A1 * | | 2/2010 | Barnes ................ G06F 3/0481 715/764 |
| 2010/0104210 A1 * | | 4/2010 | Mallat ................ G06T 5/001 382/260 |
| 2010/0182468 A1 | | 7/2010 | Posch et al. |
| 2011/0128428 A1 | | 6/2011 | Takatoku et al. |
| 2011/0298755 A1 | | 12/2011 | Ni |
| 2012/0138774 A1 | | 6/2012 | Kelly et al. |
| 2012/0313960 A1 | | 12/2012 | Segawa et al. |
| 2013/0054505 A1 | | 2/2013 | Ross et al. |
| 2013/0121590 A1 | | 5/2013 | Yamanaka et al. |
| 2013/0176552 A1 | | 7/2013 | Brown et al. |
| 2014/0125799 A1 | | 5/2014 | Bos et al. |
| 2014/0149754 A1 | | 5/2014 | Silva et al. |
| 2014/0169663 A1 | | 6/2014 | Han et al. |
| 2014/0319325 A1 | | 10/2014 | Kawahito et al. |
| 2014/0320666 A1 | | 10/2014 | Badawy et al. |
| 2014/0363049 A1 | | 12/2014 | Benosman et al. |
| 2014/0368423 A1 | | 12/2014 | Brenckle et al. |
| 2014/0368626 A1 | | 12/2014 | John Archibald et al. |
| 2014/0368712 A1 | | 12/2014 | Park et al. |
| 2015/0036942 A1 | | 2/2015 | Smirnov et al. |
| 2016/0094800 A1 | | 3/2016 | Gousev |

FOREIGN PATENT DOCUMENTS

| | | |
|---|---|---|
| DE | 1020080522930 A1 | 4/2010 |
| EP | 1973060 A2 | 9/2008 |
| EP | 2709066 A1 | 3/2014 |
| JP | 2008131407 A | 6/2008 |
| JP | 2013003787 A | 1/2013 |
| WO | WO-2012093381 A1 | 7/2012 |
| WO | WO-2014015194 A2 | 1/2014 |

OTHER PUBLICATIONS

Etienne-Cummings, R., et al., "A Programmable Focal-Plane MIMD Image Processor Chip", IEEE Journal of Solid-State Circuits, Jan. 2001, vol. 36, No. 1, pp. 64-73.
Hsiao, P.Y., et al., "A Novel CMOS Imager with 2-Dimensional Binarization and Edge Detection for Highly Integrated Systems, " Digest of Technical Papers. International Conference on Consumer Electronics, 2006, pp. 71-72.
Lahdenoja, O., et al., "A Massively Parallel Algorithm for Local Binary Pattern based Face Recognition", IEEE, ISCAS 2006, pp. 3730-3733.
Laiho, M., et al., "Dedicated Hardware for Parallel Extraction of Local Binary Pattern Feature Vectors", 2005 9th International Workshop on Cellular Neural Networks and Their Applications, IEEE, May 2005, pp. 27-30.
Pierzchala, E., et al., "High Speed Field Programmable Analog Array Architecture Design", Analogix Corporation, Feb. 1994, 61 pages.
Poikonen, J., et al., "MIPA4k: A 64×64 Cell Mixed-mode Image Processor Array", ISCAS 2009, IEEE, May 24, 2009, pp. 1927-1930.
Posch, C., et al., "An Asynchronous Time-Based Image Sensor," IEEE International Symposium on Circuits and Systems (ISCAS), 2008, 4 pages.
QUALCOMM, "FAST Corners", Sep. 15, 2015, 6 Slides (153289 IDF).
Shi, Y., et al., "Smart Cameras: Fundamentals and Classification," Chapter 2, A.N. Belbachir (Ed.), Springer Science+Business Media, LLC 2010, pp. 19-34.
Stack Overflow, "FAST Detector in every levels on Gaussian Pyramids", matlab, Retrieved from internet, URL: http://stackoverflow.com/questions/24222611/fast-detector-in-every-levels-on-gaussian-pyramids , on Sep. 11, 2015, 2 Pages.
Wikipedia, "Features from accelerated segment test", Retrieved from Internet, URL: https://en.wikipedia.org/wiki/Features_from_accelerated_segment_test#High-speed_test , on Sep. 11, 2015, 6 Pages.
Wyatt, J.L., et al., "The MIT Vision Chip Project: Analog VLSI Systems for Fast Image Acqusition and Early Vision Processing, " IEEE International Conference on Robotics and Automation, 1991, vol. 2, pp. 1330-1335.
Yu, H, "FAST Corner detection—Machine Learning for high speed corner detection", Nov. 16, 2010, 60 Slides.
Anonymous: "Pyramid (Image Processing)", May 2, 2016 (May 2, 2016), XP055269860, Retrieved from the Internet: URL:https://en.wikipedia.org/wiki/Pyramid (image processing) [retrieved on May 2, 2016].
Anonymous: "Summed Area Table" May 2, 2016 (May 2, 2016), XP055269859, Retrieved from the Internet: URL: https://en.wikipedia.org/wiki/Summed_area_table [retrieved on May 2, 2016].
Anonymous: "Viola-Jones Object Detection Framework" May 2, 2016 (May 2, 2016), XP055269858, Retrieved from the Internet: URL:https://en.wikipedia.org/wikiNiola%E2 %80%93Jones_object_detection_framework [retrieved on May 2, 2016].
Gustavo M., et al., "Real-Time Object Tracking in High-Definition Video Using Frame Segmentation and Background Integral Images" Proceedings—Brazilian Symposium on Computer Graphics and Imageprocessing, IEEE Computer Society, Los Alamitos, CA, US, Aug. 5, 2013 (Aug. 5, 2013), pp. 75-82, XP032524020, ISSN: 1530-1834, DOI: 10.1109/SIBGRAPI.2013.20 [retrieved on Nov. 5, 2013].
International Search Report and Written Opinion—PCT/US2016/019657—ISA/EPO—May 18, 2016.
Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4,

(56) References Cited

OTHER PUBLICATIONS

Dec. 1, 2012 (Dec. 1, 2012), pp. 723-736, XP011479510, ISSN 2156-3357, DOI: 10.1109/JETCAS.20122223552.

* cited by examiner

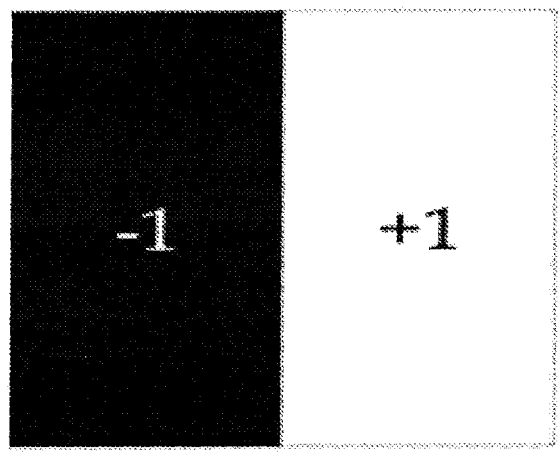
FIG. 1A
1. Edge features
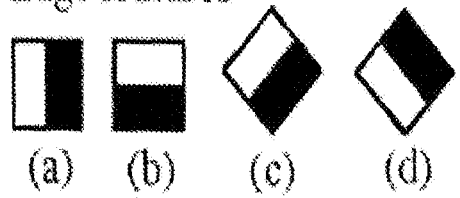
2. Line features
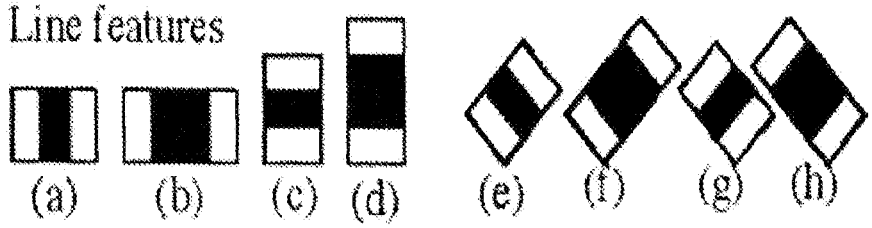
3. Center-surround features
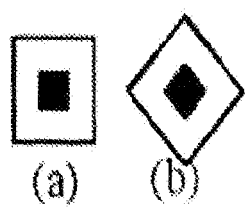
4. Special diagonal line feature used in [3,4,5]
FIG. 1B

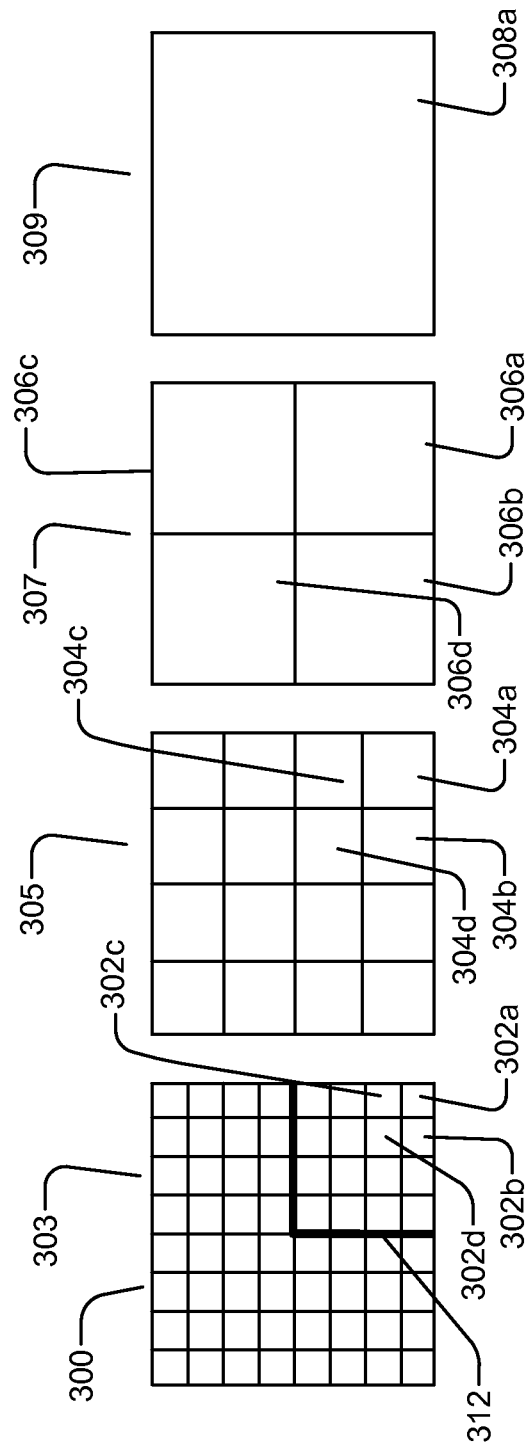

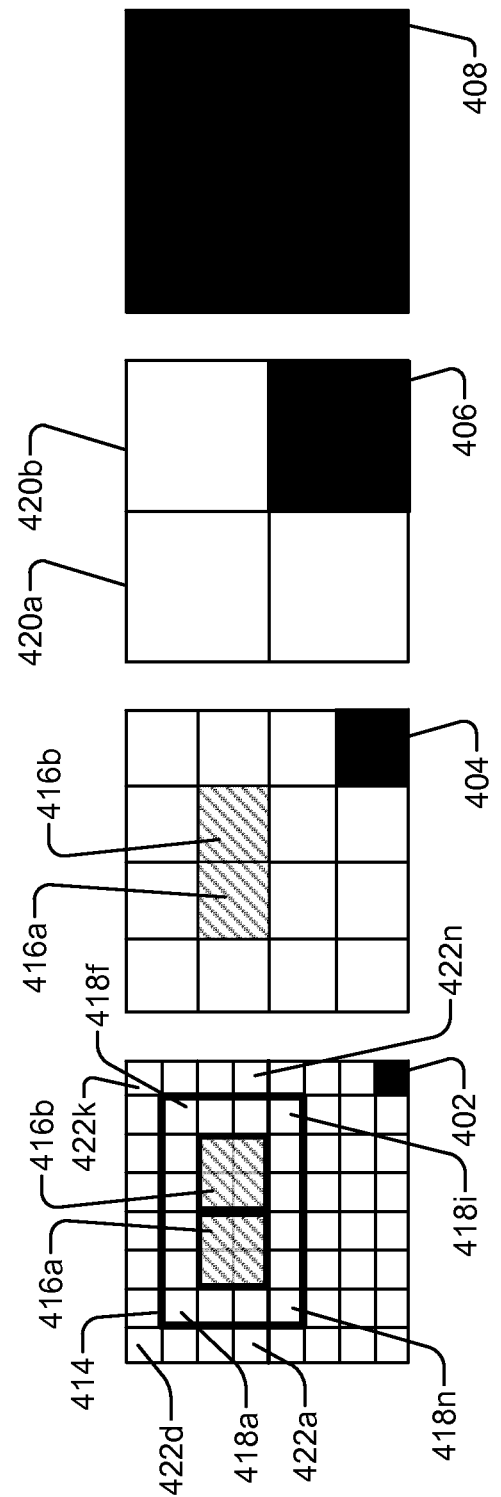

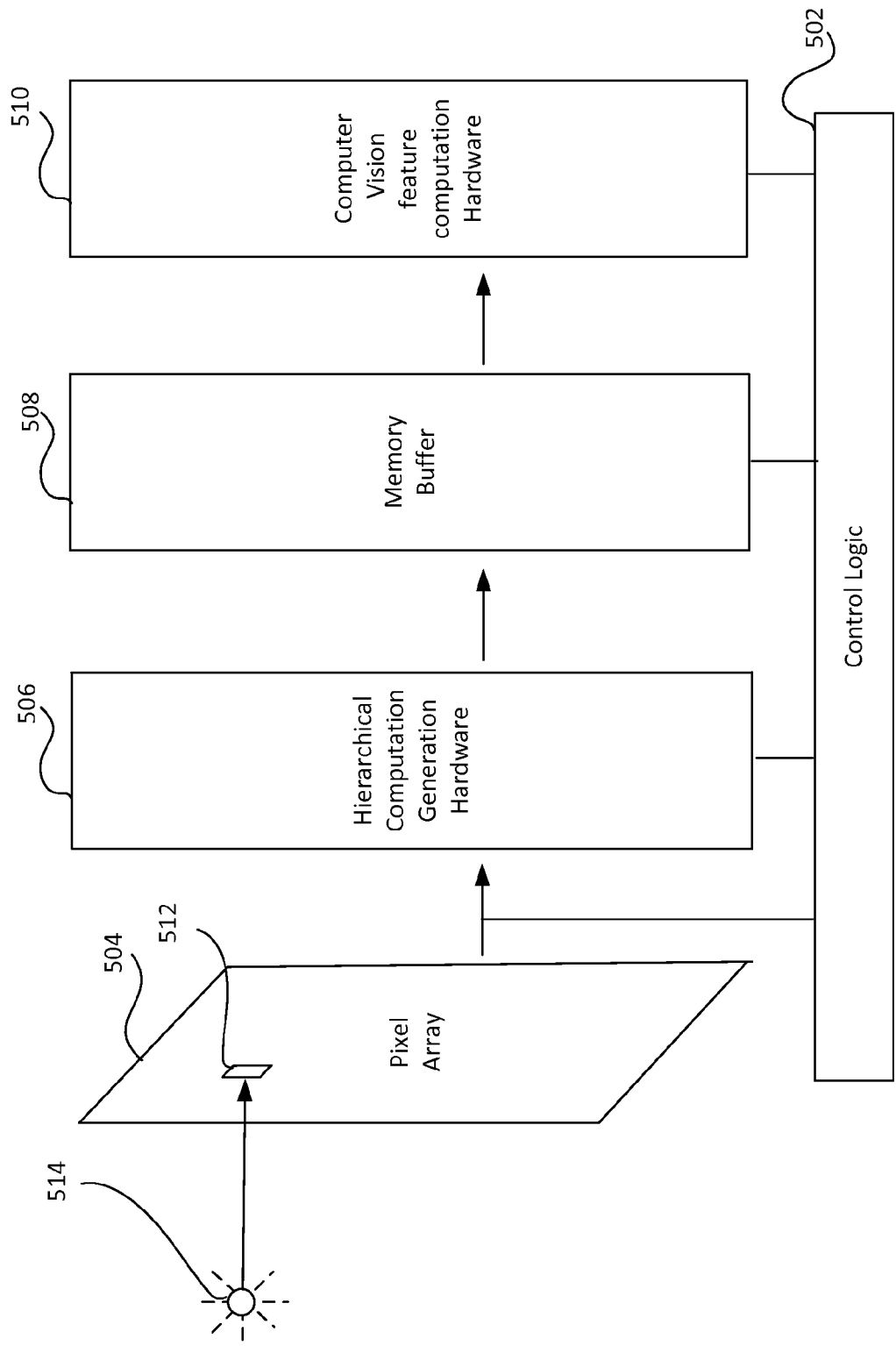

COMPUTING HIERARCHICAL COMPUTATIONS FOR COMPUTER VISION CALCULATIONS

CROSS-REFERENCE

This application is a non-provisional application and claims the benefit and priority of U.S. Provisional Application No. 62/142,336, filed on Apr. 2, 2015, titled "COMPUTING HIERARCHICAL SUMS/AVERAGES FOR COMPUTER VISION CALCULATIONS," which is herein incorporated by reference in its entirety for all purposes.

BACKGROUND

The present disclosure generally relates to enabling computer vision, and more specifically, improving efficiency for detecting features using computer vision.

Computer vision is a field that includes methods for acquiring, processing, analyzing, and understanding images for use in applications. Traditionally, a processor, coupled to a sensor, acquires image data from a sensor and performs certain computer vision (CV) operations on the information received from the sensor for detecting features and consequently objects associated with those features. Features may include features such as edges, corners, etc. In some instances, features may also include more complex features, such as human faces, smiles and gestures.

Many existing computer vision algorithms require computing a sum or average of values of pixels within a specified rectangle within an image. Such computer vision algorithms may be used, for example, in face detection and other types of image-based tasks. Some solutions incorporate the use of integral images to accelerate certain computations.

BRIEF SUMMARY

Methods, apparatus, system and a computer-readable medium are described for improving efficiency for detecting features using computer vision.

In certain aspects, techniques are disclosed for receiving values from one or more pixels from a pixel array and representing those values for facilitating computer vision operations, such as Haar-like feature computations. In one implementation, the pixel values are represented as a hierarchy of computations. Each level above the lower level of the hierarchy of computations may include one or more values representing a computation based on the values from a lower level of the hierarchy.

In certain aspects of the disclosure, an example method may include representing values from two or more pixels of a pixel array as a hierarchy of computations, each level above a lower level of the hierarchy of computations comprising one or more values representing a computation based on values from the lower level of the hierarchy and each level of the hierarchy of computations associated with a region in an image captured by the pixel array, wherein each pixel of the pixel array comprises a sensory element capable of generating a sensor reading based on environmental conditions, and updating the hierarchy of computations based on a new value of a pixel in the pixel array only if the new value of the pixel differs from a previous value of the pixel by an amount greater than a reference threshold and not updating the hierarchy of computations if there is no value among values of pixels in the pixel array that has changed greater than the reference threshold.

In certain aspects, the computation can include a simple sum of the values for the lower level of the hierarchy, a weighted sum of the values for the lower level of the hierarchy, an average of the values for the lower level of the hierarchy, a local binary pattern (LBP) based on the values for the lower level of the hierarchy, a histogram of oriented gradients based on the values for the lower level of the hierarchy, or other computer vision feature computation based on the values for the lower level of the hierarchy.

An example computing system, such as a mobile device, may determine computer vision features. The computer system may include a vision sensor comprising a plurality of pixels, the pixels arranged along at least a first dimension and a second dimension of a pixel array, each of the plurality of pixels capable of generating a signal based on light incident upon the respective pixel, hierarchical computation generation hardware coupled to the vision sensor and a memory buffer, and configured to maintain a representation of the plurality of pixels of the pixel array as a hierarchy of computations in the memory buffer, each level above a lower level of the hierarchy of computations comprising one or more values representing a computation based on values from the lower level of the hierarchy and each level of the hierarchy of computations associated with a region in an image captured by the pixel array. The hierarchical computation generation hardware may be further configured to update levels of the hierarchy of computations above a given level based on a new value at the given level only if the new value differs from a previous value by an amount greater than a reference threshold and not updating the levels of the hierarchy of computations above the given level if there is no value among values of the given level that has changed greater than the reference threshold. The example computing system may also include a computer vision feature computation hardware configured to compute a computer vision feature based on the updated hierarchy of computations.

In certain aspects of the disclosure, the new value may be accompanied by an event indicating that one or more values at the given level have changed beyond the reference threshold. The given level may be a pixel level and the event comprises detecting a change in the voltage level caused by the change in the sensing environment at the pixel beyond a reference voltage threshold.

In certain aspects of the disclosure, the hierarchy of computations may include a hierarchy of sums wherein each level above the lower level of the hierarchy of sums comprises one or more values representing a weighted summation of values from the lower level of the hierarchy and wherein the hierarchy of sums is used for computing a Haar-like feature for a sample region of an image. Haar-like feature may be computed based on a summation value corresponding to a level in the hierarchy of sums that most closely approximates the sample region of the image. The level in the hierarchy of sums that most closely approximates the sample region of the image to be summed comprises the level associated with the largest region in the image bounded by the sub-region of the sample region of the image.

In certain other aspects of the disclosure, the computation may be based on the values from the lower level of the hierarchy for the level above the lower level is one of a simple sum, a weighted sum, or an average. The computation based on the values from the lower level of the hierarchy for the level above the lower level may be a computer vision computation. In certain implementations, updating the levels of the hierarchy of computations above the given level comprises only updating some of the values in each of the levels of the hierarchy of computations above the given level.

Aspects of the disclosure further disclose methods, and apparatus comprising means for performing aspects disclosed above and throughout the disclosure. Aspects of the disclosure, further disclose a non-transitory computer-readable storage medium, wherein the non-transitory computer-readable storage medium may include instructions executable by a dedicated computer vision (CV) microprocessor for performing aspects of the disclosure discussed above and throughout the specification.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. In the accompanying figures and like reference numbers indicate similar elements.

FIGS. 1A and 1B illustrate a method for face detection using Haar-like features;

FIGS. 3A, 3B, 3C and 3D describe an example hierarchy of sums;

FIGS. 4A, 4B, 4C and 4D illustrate the summation process for determining the sum values after a change in at least one pixel value is recognized;

FIG. 5 is a block diagram illustrating aspects of an example system comprising a vision sensor for detecting computer vision (CV) features;

DETAILED DESCRIPTION

Figure 2A:
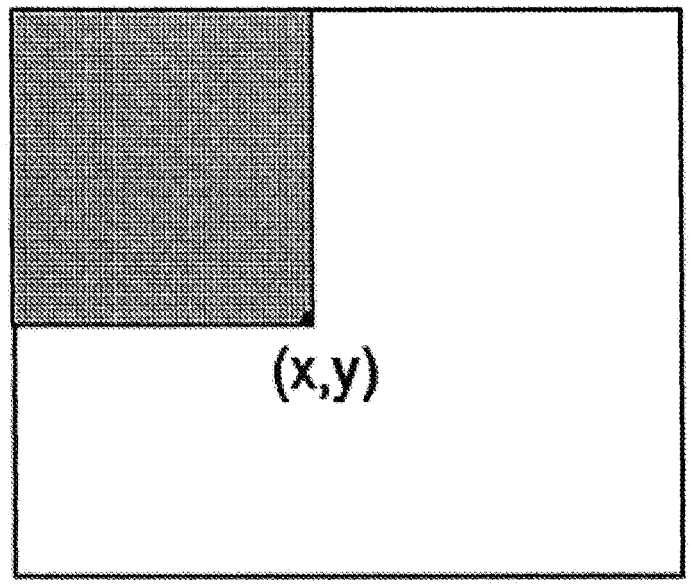
FIGS. 2A and 2B illustrate an example method of efficiently computing a sum of the pixels values within an arbitrary rectangle in an image using a 2-D integral image.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

FIGS. 1A and 1B illustrate summations used in an example method for face detection using Haar-like features.

The example method briefly described with reference to FIGS. 1A and 1B may use the Viola-Jones Algorithm and Haar-like features to detect a face within an image.

A typical Haar-like feature considers adjacent rectangular regions at a specific location in a detection window within the image, sums up the pixel intensities in each region and calculates the difference between these sums. A simple rectangular Haar-like feature can be defined as the difference of the sum of pixels of areas inside the rectangle, which can be at any position and scale within the original image. This difference is then used to categorize subsections of an image. For example, a common Haar-like feature for face detection is a set of two adjacent rectangles that lies above the eye and the cheek region. The position of these rectangles is defined relative to a detection window that acts like a bounding box to the target object (the face in this case). An example of two-adjacent rectangles is depicted in FIG. 1A. The sum of pixel values determined to be in the left "black" region may be multiplied by −1 and the sum of pixel values determined to be in the right "white" region may be multiplied by +1. These two numbers may then be summed together to obtain the value for the Haar-like feature for the region of the image bounded by the window containing the adjacent rectangles. This may be repeated for each adjacent rectangle pair within the window, or in some cases within sub-windows of the window.

In the detection phase of the Viola-Jones algorithm, a window of the target size is moved over the input image, and for each subsection of the image the Haar-like feature is calculated. The difference is then compared to a learned threshold that separates non-objects from objects. Because such a Haar-like feature is only a weak learner or classifier (its detection quality is slightly better than random guessing), a large number of Haar-like features are necessary to describe an object with sufficient accuracy. Accordingly, in the Viola-Jones algorithm, the Haar-like features are organized in something called a classifier cascade to form a strong learner or classifier.

Various adjacent rectangles that can be used by the Viola-Jones algorithm are depicted in FIG. 1B. For example, adjacent rectangles may be used to detect edge features in an image (e.g., 1a, 1b, 1c, 1d). In another example, a plurality of adjacent rectangles may be used to detect line features in an image (e.g., 2a, 2b, 2c, 2d, 2e, 2f, 2g, 2h). In yet another example, a rectangle contained within a rectangle can be used to detect center-surround features in an image (e.g., 3a, 3b). In yet another example, a plurality of rectangles can be arranged to detect special diagonal line features in an image (e.g., 4).

Figure 2B:
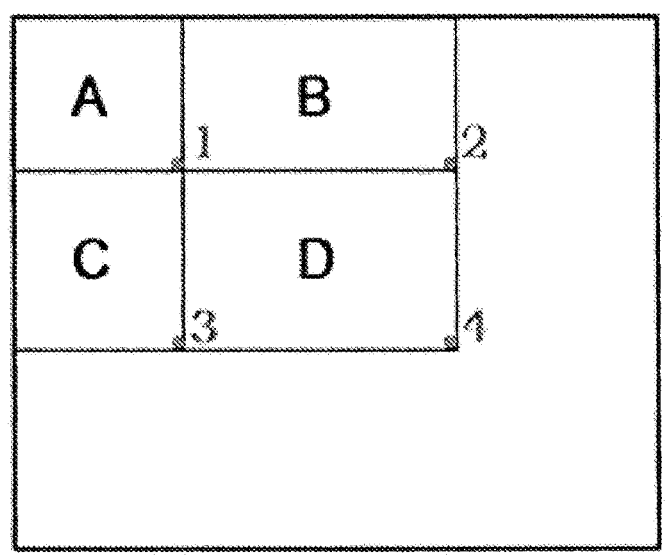

FIGS. 2A and 2B illustrate an example method of efficiently computing a sum of the pixel values within an arbitrary rectangle in an image using a 2-D integral image. The summation of the pixel values in the rectangles described above with respect to FIGS. 1A and 1B can be inefficient due to the vast number of computations required. The use of a 2-D integral may allow for more efficient computations in determining the sum of pixel values for the region of the image bounded by the window containing the adjacent rectangles. As shown in FIG. 2A, for any given x-y coordinate, the sum of all pixel values in the range from the top and left (up-left region) of the x-y coordinate can be summed (illustrated by the shaded region). This sum of the pixel values in this region can be retained in memory for computational efficiency. A so-called integral image can be defined as a two-dimensional summed area lookup table in the form of a matrix with the same size of the original image. Each element of the integral image contains the sum of all pixels located on the up-left region of the original image. This allows for the quick computation of the sum of pixel values in an arbitrary rectangle over the image using the integral image.

For example, as illustrated in FIG. 2B, using an integral image, the sum of the pixels of sub-window "D" can be computed by subtracting the value of x-y coordinate 2 and x-y coordinate 3 from x-y coordinate 4, and then adding x-y coordinate 1 to x-y coordinate 4 of the integral image. In other words: Sum('D')=Value('4')−Value('2')−Value('3')+Value('1'). Accordingly, only four look-ups are required to determine the sum of the pixels of sub-window "D". Generating an integral image once can improve computational efficiency as compared to computing the sum of pixel values using the original image values if pixel value sums are to be computed for multiple different windows over the image. However, integral images can require frequent re-computation if a pixel value changes. For example, given that the integral image represents the sum of pixel values in the up-left rectangle at any x-y coordinate in the image, changes to pixels that occur in the upper left hand quadrant require much or most of the integral image to be recomputed.

A hierarchy of sums may help reduce the number of computations needed to update the hierarchy when a single or a few pixels change compared to the number of computations needed to update an integral image.

FIGS. 3A-D describes an example hierarchy of sums, wherein FIG. 3A illustrates a zeroth level of the pyramid (for example pixel values associated with an input image), FIG. 3B illustrates a first level of the pyramid, FIG. 3C illustrates a second level of the pyramid and FIG. 3D illustrates a third level of the pyramid. The various sums in FIG. 3A-3D can be used for calculating Haar-like features instead of using integral images. In contexts where the image is dynamic and changing, but only few pixel changes are expected to change in the relevant time frame, updating the hierarchy of sums may be more efficient than updating the integral image. While the remaining description will describe a hierarchy of sums by way of example, it is understood that, more generally, the hierarchy may be one of a hierarchy of computations, where each level above a lower level of the hierarchy of computations comprises one or more values representing a computation based on values from the lower level of the hierarchy. The computation can include a simple or weighted sum of the values for the lower level of the hierarchy, an average of the values for the lower level of the hierarchy, a local binary pattern based on the values for the lower level of the hierarchy, a histogram of oriented gradients based on the values for the lower level of the hierarchy, or other computer vision feature computation based on the values for the lower level of the hierarchy. In some implementation, the computation for each level may be different, so, as an explanatory example, one level in the hierarchy of computations may represent a sum based on values from the level below the one level, while another level of the hierarchy of computations may represent an LBP computation based on values from the level below the other level. More generally, a first level in the hierarchy may represent a first computation based on values from a level in the hierarchy lower than the first level, while a second level in the hierarchy may represent a second computation based on values from a level in the hierarchy lower than the second level. In one implementation, the first level is a level lower than the second level and the first computation includes one of a sum, weighted sum, or average, while the second computation includes a computation of a CV feature.

FIG. 3A may represent a simplified pixel array 300 comprising 64 pixels. Each pixel from the pixel array may include a sensor element capable of generating a sensor reading based on environmental conditions. As can be seen in the lower right-hand corner in FIG. 3A, four pixels 302a, 302b, 302c, and 302d may each have pixel values associated with them representing a sensor reading based on environment conditions, for example, an intensity of light. The values of all the pixels in the pixel array 300 can represent an image.

FIG. 3B visually illustrates merging or summation of a group of four cell values (i.e., pixel values) from FIG. 3A into a single cell in FIG. 3B. For example, two or more pixels of the pixel array can be represented as a hierarchy of sums as described below with reference to FIGS. 3B, 3C, and 3D. The pixel values from all pixels in the array can be viewed as an array of values and can represent the lowest level in the hierarchy of sums, zeroth sum level 303. In the hierarchy of sums, each level (e.g., 305, 307, 309) above a lower level (e.g., 303, 305, 307) of the hierarchy of sums comprises one or more values representing a weighted summation of values from the lower level (e.g., 303, 305, 307) of the hierarchy. As illustrated in FIGS. 3A and 3B, pixel values associated with pixels 302a, 302b, 302c, and 302d can all be represented as a weighted sum in an array element as value 304a in the first sum level 305. Values 304b, 304c, and 304d also represent weighted sums of associated pixel values from the zeroth sum level 303. Subsequently, values 304a, 304b, 304c, and 304d of first sum level 305 may be represented as a weighted sum in an array element as value 306a of the second sum level 307. Finally, in the illustrated example, values 306a, 306b, 306c, and 306d of the second sum level 307 may be represented as a weighted sum in an array element as value 308a of the third sum level 309. In this example, third sum level 309 is the final sum level in the hierarchy of sums, and therefore represents the weighted sum of all of the pixel values from pixel array 300. Also, each level of the hierarchy of sums is associated with a region in the image captured by the pixel array 300. For example, value 304a of first sum level 305 is associated with a region of the image represented by pixels 302a, 302b, 302c, and 302d. As illustrated, as an example, value 306a in second sum level 307 is associated with a region of the image represented by the 4×4 pixel area illustrated by box 312. As illustrated, as an example, the final sum level, third sum level 309, includes value 308a, which is associated with a region comprising the entire illustrated image.

As shown in FIGS. 4A-D, in such a scheme, for a change in a pixel value 402, only nine summations may be needed to recalculate the sum of the entire pixel array. Values representing weighted sums in the hierarchy that are not affected by the change in pixel value need not be updated, thereby reducing the number of computations and reducing power consumption.

The number of levels of the pyramid is proportional to the number of pixel values in the pixel array. In one implementation, the number of pyramid levels may be logarithmic and may be represented by |log 2[S]|, where S is the number of pixels in the pixel array. For each cell in the pyramid at each level, the cell stores the sum of values of the four cells under it in the lower level. The topmost cell (i.e., FIG. 3D) ends up carrying a sum of all the pixels.

It should be noted, that the weighted sum of the values from a lower sum level in the hierarchy can, in some embodiments, be a simple sum or, in other embodiments, be the average of the values from the lower sum level. Depending on the particular application, a simple sum, an average, or other weighting scheme may be advantageous in implementations where using one kind of weighted sum over another may lead to computational, processing or power savings.

Detection of Haar-like features may be performed using a myriad of sensor technologies comprising a sensor similar to pixel array 300 (FIG. 3A), such as frame-based sensor technology or event-based sensor technology, or a hybrid frame-event-based architecture. In such an architecture, the values at each pixel are evaluated at a given frame rate (at a regular time interval at which the pixel value is evaluated); however, a pixel will only output a new pixel value if the new pixel value is different from the previous pixel value at the previous interval by greater than some reference threshold. If the pixel value has not changed, or has changed by an amount under the reference threshold, the pixel value is not updated and the old pixel value can still be used. Regardless of the underlying sensor technology or architecture, the hierarchy of sums described above need only be updated if a pixel value has changed, and need not be updated if no pixel has changed value by an amount greater than the reference threshold. In event- or hybrid frame-event-based technologies, a microprocessor may receive an indication from the sensor that one or more pixels have changed values, and hence the effected sums in the hierarchy of sums can be updated. However, even with a frame-based approach, the microprocessor may also algorithmically check to see if the hierarchy of sums needs to be updated.

FIGS. 4A-D illustrate the summation process for determining the sum values after a change in at least one pixel value is recognized. For the levels of 4A-D, if a change in value occurs at pixel 402, only the cells or sub-cells within the hierarchy corresponding to a region in the image including the changed pixel value, pixel 402, needs to be recomputed. All other values (unshaded values) can be reused for the summation process without being recomputed. In the hierarchy of sums, sums corresponding to shaded area 408 (representing the sum of the entire image), shaded area 406 (representing the sum for a quadrant of the image, the quadrant including the pixel 402 with the changed pixel value), and shaded area 404 (representing a sum of the image in an area including the pixel 402) will be recomputed.

The shaded area in FIG. 4A (block 402) illustrates the pixel of the pixel array at which the event was detected, that is, the pixel at which the pixel value has changed beyond a reference threshold. In FIG. 4B, the shaded area 404 illustrates the cell with the summation value of the pixel values for four pixels that includes the pixel 402 and the value for its neighboring pixels from FIG. 4A. The shaded area 404 includes the summation of four sub-cells from FIG. 4A and the summation of four cells requires three summations.

In FIG. 4C, the value of shaded area 406 is calculated by summing the values of the cells in the level below (cells from FIG. 4B) for block 406. It should be noted that all the unshaded cells in FIG. 4B have their values pre-computed, since no events have been triggered in the pixels associated with the unshaded cells (from FIG. 4A). The summation process for determining the value of block 406 in FIG. 4C requires another three summation operations for the four cells.

Similarly, in FIG. 4D, the value of the entire pixel array can be calculated by summing the values of the cells in the level below. Again, the values for the unshaded cells in FIG. 4C have not changed as a result of the event shown in FIG. 4A, since the pixel 402 is not a sub-cell for any of the unshaded cells, as depicted in FIG. 4C. As such, for recalculating the sum of the pixel array in FIG. 4D, due to an event or change in the pixel value at pixel 402 in FIG. 4A, only nine summations are needed.

Therefore, the above process optimizes the calculation for the summations represented at each x-y coordinate by re-using the hierarchy of summations. All events at the given scale are updated at the next higher level. Once the update is completed at a given scale, the next higher level is iteratively updated by only accounting for the changed cells.

The hierarchy of sums can be used in a way somewhat analogous to the use of an integral image discussed above. For example, as mentioned above, to compute a Haar-like feature, the sum of pixel values in a given rectangle may need to be computed. The use of the hierarchy of sums can be illustrated with reference to window 414 in FIG. 4A. If the sum of all pixel values in window 414 is to be computed, the use of sum values corresponding to cells or blocks 416*a* and 416*b* (FIG. 4B), shown greyed out, from the first sum level in the hierarchy, can be used to make the computation more efficient than simply summing all of the pixels within window 414 in FIG. 4A. As can be seen, in addition to sum values 416*a* and 416*b*, pixel values 418*a* . . . 418*n* will also need to be added. However, this still reduces the number of computations needed to compute the sum of pixel values for arbitrary window 414. Alternatively, window 414 can be computed by using sum values corresponding to cells or blocks 420*a* and 420*b* from the second sum level in the hierarchy (shown in FIG. 4C). In this example, to compute the sum of pixel values within window 414, one would add the sum values corresponding to 420*a* and 420*b*, subtract all of the pixel values 422*a* . . . 422*n*, and add values 418*i* . . . 418*n*. While this example shows some number of additional computations, it is understood that the sum values from the hierarchy of sums does reduce some computational complexity. Furthermore, in situations where the window more closely aligns with the regions associated with a particular sum level in the hierarchy, computational efficiencies will be even greater.

FIG. 5 is a block diagram illustrating aspects of an example system comprising a vision sensor for detecting computer vision (CV) features.

A vision sensor may include a pixel array 504 of a plurality of pixels, similar to the pixel array discussed in FIG. 3A and FIG. 4A. The pixel array 504 may be a 2-dimensional array that includes pixels arranged in two dimensions, such as columns and rows, of the pixel array. Each of the pixels may be capable of generating a sensor reading based on environmental conditions. For example, a photodiode may provide a means for receiving sensor readings. In certain implementations, the vision sensor may generate sensor readings based on light incident upon the pixels. In various implementations, the shape of the pixels, the number of pixels and the spacing between the pixels may vary, even vastly, without departing from the scope of the invention. Pixel 212 represents an example pixel from the grid of pixels.

In certain implementations, a hierarchical computation generation hardware 506 module may be implemented as peripheral circuitry (computation structure) coupled to the pixels for maintaining hierarchical computation values for CV calculations in a memory buffer 508. In some instances, such peripheral circuitry may also be referred to as on-chip sensor circuitry.

In certain implementations, the hierarchical computation generation hardware 506 may be in communication with dedicated CV computation hardware coupled to the pixel array 504 and implemented using an Application Specific Integrated Circuit (ASIC), Field Programmable Gate Array (FPGA), embedded microprocessor, or any similar analog or digital computing logic for performing aspects of the disclosure. The analog or digital computing logic of one, the other, or both of the hierarchical computation generation hardware and the CV computation hardware may provide adders, comparators, multiplexers, demultiplexers, shifters and several other components as a means for performing hierarchical or CV computations described herein.

The hierarchical computation generation hardware 506 may maintain a representation of the plurality of pixels of the pixel array as a hierarchy of computations in the memory buffer 508. As previously discussed in FIGS. 3A-D and 4A-D, each level above a lower level of the hierarchy of computations may include one or more values representing a computation based on values from the lower level of the hierarchy and each of the one or more values at each level of the hierarchy of computations is associated with a region in an image captured by the pixel array. According to certain aspects of the disclosure, updating the levels of the hierarchy of computations above the given level comprises only updating some of the values in each of the levels of the hierarchy of computations above the given level. For example, in a level where the pixels are divided up into four quadrants for the level, if an event is detected in one of the four quadrants of a grid of pixels, then the computations may be performed only for the quadrant in which the event was detected, thereby reducing the number of required computations.

In some implementations, the hierarchy of computations maintained in the memory buffer 508 by the hierarchical computation generation hardware 506 may include a hierarchy of sums wherein each level above the lower level of the hierarchy of sums comprises one or more values representing a weighted summation of values from the lower level of the hierarchy. In certain implementations, digital, analog or logical multiplexers and demultiplexers may be provided as a means for selecting and deselecting certain portions of the hierarchy of computations and digital, analog or logical adders may be used for adding certain values from the hierarchy of computations.

In certain aspects of the disclosure, the computer vision feature computation hardware 510 may be configured to read the values from the memory buffer 508 and compute a computer vision feature based on the updated hierarchy of computations. The computer vision feature computation hardware 510 may be a discrete processor or a general purpose processor configured to compute computer vision features, in hardware, firmware, software or any combination thereof. In one aspect of the disclosure, computer vision computation may be based on the values from the lower level of the hierarchy for the level above the lower level. For example, the hierarchy of sums may be used by the computer vision feature computation hardware 510 in computing a Haar-like feature for a sample block of pixels in an image. A sample block may refer to a sub-portion of the image. The Haar-like feature may be computed based on summation values corresponding to a level in the hierarchy of sums that most closely approximates the sample block of pixels of the image, as illustrated with reference to FIG. 4A and window 414. A level in the hierarchy of sums that most closely approximates the sample block of the image to be summed may be the level in the hierarchy associated with the largest region in the image bounded by the sample block of the image. The region bounded by the sample block is used herein to refer to a region that fully lies within the sample block. Alternatively, a level in the hierarchy of sums that most closely approximates the sample block of the image to be summed may be the level in the hierarchy associated with the smallest region in the image fully bounding the sample block of the image. A region bounding the sample block is used herein to refer to a region for which the block lies fully within the region. As shown in the discussion of FIG. 4A and window 414, however, there may be multiple ways of computing a sum of pixel values within a sample block of pixels using different regions at different levels in the hierarchy that are all more efficient than individually adding up the pixels within the sample block.

In certain implementations, control logic 502 may invoke certain functions in the hierarchical computation generation hardware 506, memory buffer 508 and the computer vision feature computation hardware 510. For example, a change in the light (e.g., blinking light, 514) and/or voltage as a result of the change in light may be detected in the pixel array 504 and an event may be generated. An event may indicate that the light or voltage has changed beyond a pre-set, preconfigured or dynamically configured reference threshold value and cause the event to be triggered to other functional blocks. Digital, analog or logical comparators may be provided as a means for performing such comparisons. For example, an event may trigger the hierarchical computation generation hardware 506 to update the hierarchy of computations, the memory buffer 508 to load or store information, and the computer vision feature computation hardware 510 to compute computer vision features from the provided data.

Furthermore, aspects of the invention may be implemented in in-pixel circuitry, peripheral circuitry or in dedicated processing logic or in any combination thereof. As used herein, in-pixel circuitry can refer to circuitry or logic that is integrated into pixel array 504, while peripheral circuitry can refer to circuitry that is not integrated or is external to pixel array 504. Also, aspects of the invention may be implemented in analog domain and/or digital domain or any combination thereof.

Although vision sensors are discussed above, according to certain aspects of the disclosure, a variety of different sensors may be improved according to aspects of the current disclosure. Example sensors may include light sensors, olfactory sensors and/or chemical sensors. Although light sensors are discussed throughout the disclosure, similar techniques may be employed in other types of sensors without deviating from the scope of the invention.

Computer Vision feature computation hardware 510 may be configured to compute a computer vision feature based on the updated hierarchy of computations.

Figure 6:
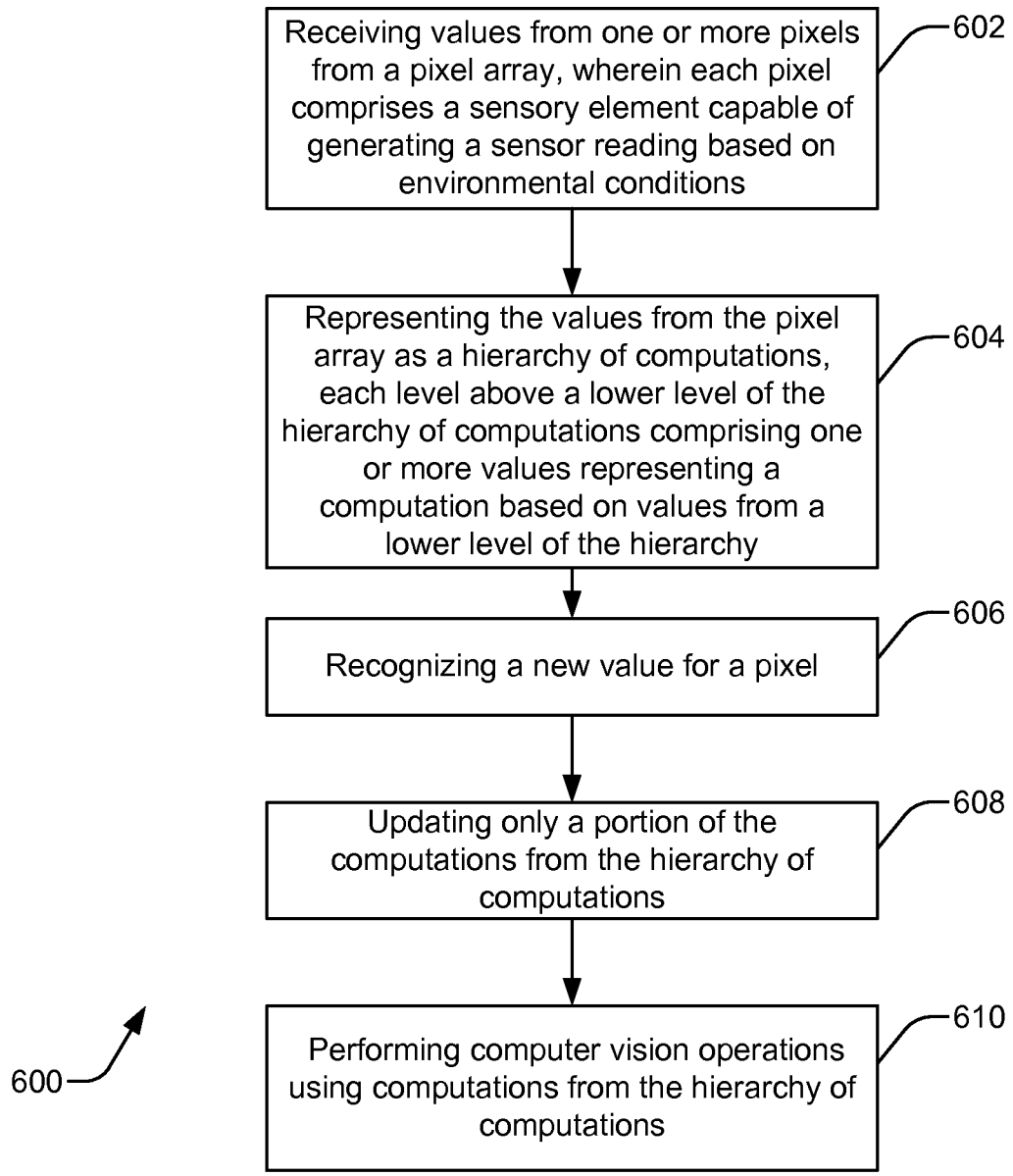
FIG. 6 is an example flowchart, according to certain aspects of the disclosure.

FIG. 6 is an example flowchart, according to certain aspects of the disclosure. Some or all of the process 600 (or any other processes described herein, or variations and/or combinations thereof) may be performed by circuitry on the pixel array, a computing system coupled to the pixel array or any combination thereof. In some instances, instructions stored on a non-transient computer readable medium may be used in performing one or more blocks or portions of blocks described below.

At block 602, components of the pixel array or the computing device coupled to the pixel array receive values from one or more pixels from a pixel array, wherein each pixel comprises a sensory element capable of generating a sensor reading based on environmental conditions.

At block 604, components of the pixel array or the computing device coupled to the pixel array represent the values from the pixel array as a hierarchy of computations, each level above a lower level of the hierarchy of computations comprising one or more values representing a computation based on values from a lower level of the hierarchy.

In certain aspects, the hierarchy of computations comprises one or more values representing a computation based on values from the lower level of the hierarchy. The computation can include a simple or weighted sum of the values for the lower level of the hierarchy, an average of the values for the lower level of the hierarchy, a local binary pattern based on the values for the lower level of the hierarchy, a histogram of oriented gradients based on the values for the lower level of the hierarchy, or other computer vision feature computation based on the values for the lower level of the hierarchy. Different levels in the hierarchy of computations may also represent different computations. For example, a first level of the hierarchy of computations may represent a local binary pattern based on the values from pixels in the pixel array, and higher levels of the hierarchy may represent a different computation of the local binary pattern values of the first level. As another example, a first level of the hierarchy of computations may represent a simple or weighted sum based on the values from pixels in the pixel array, and a higher level of the hierarchy may represent one of a local binary pattern, a histogram of oriented gradients, or other computer vision feature based on the first level. An even higher level of the hierarchy may represent a different computation upon the one of the local binary pattern, the histogram of oriented gradients, or the other computer vision feature. In some implementations, at least two levels of the hierarchy of computations involve different computations performed on the values of the lower level.

At block 606, components of the pixel array or the computing device coupled to the pixel array, recognize a new value for a pixel. For example, a new value for a pixel may be recognized in response to or by way of receiving at least one event. An event may occur based on detecting a change in the voltage level caused by the change in the sensing environment at the pixel beyond a reference threshold.

At block 608, components of the pixel array, or the computing device coupled to the pixel array, in certain embodiments, update only a portion of the computations from the hierarchy of computations. Only sum values associated with the changed pixels are changed, while unaffected sum values are not recalculated.

At block 610, components of the pixel array, or the computing device coupled to the pixel array, may perform computer vision operations using computations from the hierarchy of computations. Computer vision operations may include detecting Haar or Haar-like features, as discussed by way of example herein for implementations where the hierarchy of computations is a hierarchy of sums. However, other computer vision methods also use computations based on pixel values (such as sums), such as LBP or extensions of LBP, and hence other computer vision techniques may also benefit from the use of a hierarchy of computations. The pixel array may be a one-dimensional array, two-dimensional array or three-dimensional array.

In certain embodiments, representing the values in the pixel array as a hierarchy of computations includes representing the values in the pixel array as a hierarchy of averages. The computer vision operations, such as Haar-like feature computations, may be performed using the hierarchy of averages.

In one implementation, for averaging a group of cells storing values, the group of cells may be shorted together to average out the stored values in the cells. Such a technique may allow for computation, power and circuitry efficiency, yet may, however, also result in a destructive operation, destroying the data that the average is generated from.

It should be appreciated that the specific steps illustrated in FIG. 6 provide a particular method of updating a hierarchy of computations to increase the efficiency of subsequent operations, such as computer vision computations and/or operations, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 6 may include multiple sub-steps that may be performed in various sequences as appropriate to the individual step. Furthermore, additional steps/blocks may be added or removed depending on the particular applications. One of ordinary skill in the art would recognize and appreciate many variations and modifications.

Figure 7:
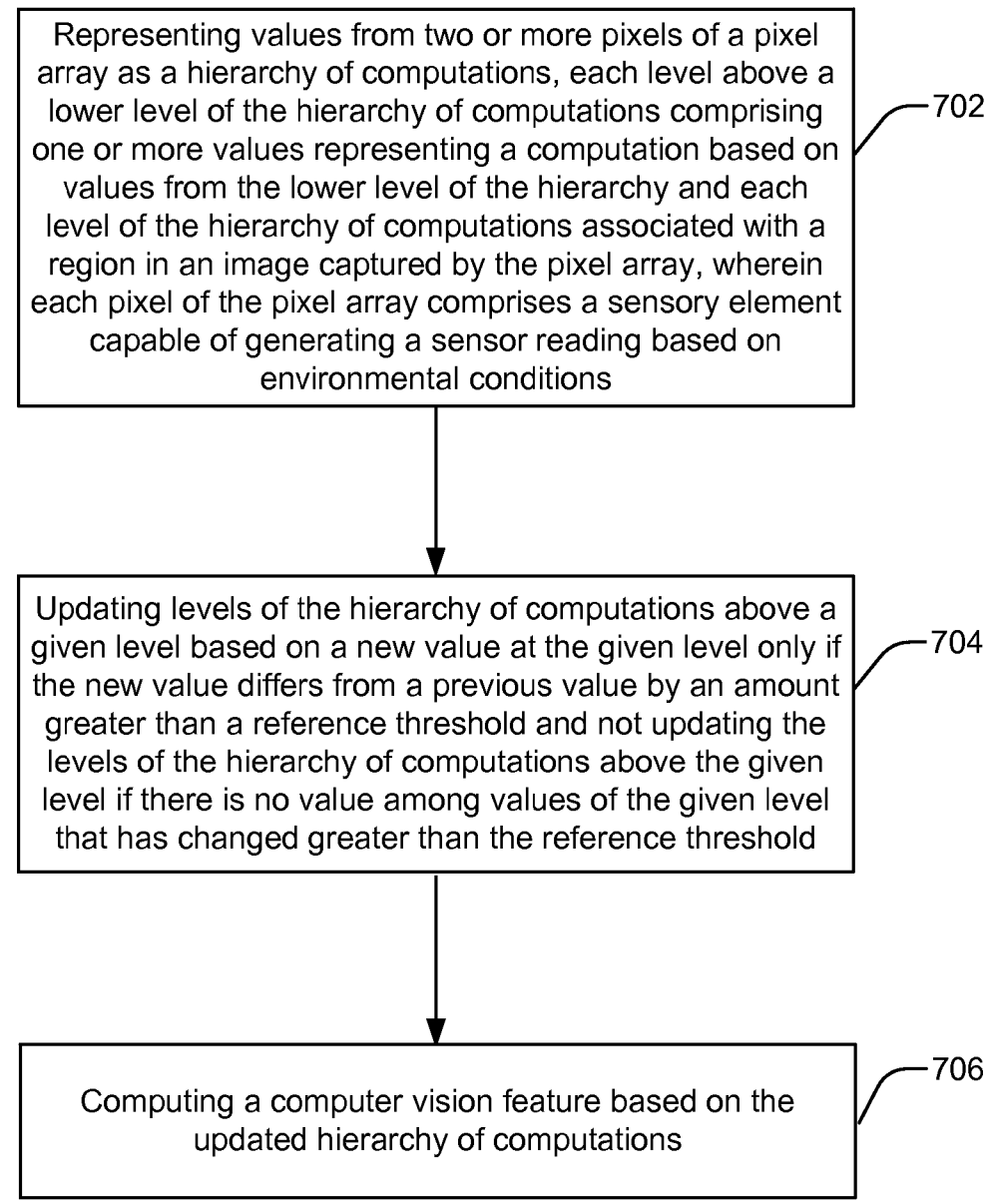
FIG. 7 is another example flowchart, according to certain aspects of the disclosure.

FIG. 7 is an example flowchart, according to certain aspects of the disclosure. Some or all of the process 700 (or any other processes described herein, or variations and/or combinations thereof) may be performed by circuitry on the pixel array, a computing system coupled to the pixel array or any combination thereof. In some instances, instructions stored on a non-transient computer readable medium may be used in performing one or more blocks or portions of blocks described below.

At block 702, components of the pixel array or the computing device coupled to the pixel array represent values from two or more pixels of a pixel array as a hierarchy of computations, each level above a lower level of the hierarchy of computations comprising one or more values representing a computation based on values from the lower level of the hierarchy and each level of the hierarchy of computations associated with a region in an image captured by the pixel array, wherein each pixel of the pixel array comprises a sensory element capable of generating a sensor reading based on environmental conditions.

In certain aspects, the hierarchy of computations comprises one or more values representing a computation based on values from the lower level of the hierarchy. The computation can include a simple or weighted sum of the values for the lower level of the hierarchy, an average of the values for the lower level of the hierarchy, a local binary pattern based on the values for the lower level of the hierarchy, a histogram of oriented gradients based on the values for the lower level of the hierarchy, or other computer vision feature computation based on the values for the lower level of the hierarchy.

At block 704, components of the pixel array or the computing device coupled to the pixel array update levels of the hierarchy of computations above a given level based on a new value only if the new value differs from a previous value by an amount greater than a reference threshold and not updating the levels of the hierarchy of computations above the given level if there is no value among values of the given level that has changed greater than the reference threshold. For example, a first level of the hierarchy of computations may represent local binary pattern computations for a plurality of pixels of an image. While many pixel values in the image may change from image to image when the system is capturing images at a given frame rate, the values of the local binary pattern may not be changing. Hence, the local binary pattern may be recomputed for pixels showing a change in pixel value above a reference threshold, but if the local binary pattern value is not changed, then higher levels of the hierarchy of computations need not be recomputed. However, if a change is detected for one or more local binary pattern values in the first level of this example, then levels of the hierarchy of computations above this first, local binary pattern computation level of the hierarchy can be updated. In such a case, only values corresponding to the same region of the image as the changed local binary pattern value need updating, and hence updating the levels of the hierarchy of computations above the given level can comprise only updating some of the values in each of the levels of the hierarchy of computations that is above the given level. For implementations where the hierarchy of computations is a hierarchy of sums, a change in a pixel value will change the values for the sums in the various levels corresponding to the region of the display in which the pixel resides, not all sum values in each level (except for the highest level, which may represent a sum of the entire image). In the case of a hierarchy of sums, updating levels of the hierarchy of computations above a given level based on a new value at the given level can comprise updating the hierarchy of sums based on a new value of a pixel in the pixel array only if the new value corresponding to the pixel differs from a previous value by an amount greater than a reference threshold and not updating the hierarchy of sums if there is no value among values corresponding to the pixels in the pixels array that has changed greater than the reference threshold.

At block 706, components of the computing device, compute a computer vision feature based on the updated hierarchy of computations. The hierarchy of computations may include summations, averages or other suitable operations. For example, the hierarchy of compuations may include a hierarchy of sums wherein each level above the lower level of the hierarchy of sums comprises one or more values representing a weighted summation of values from the lower level of the hierarchy. The hierarchy of sums may be in computing a Haar-like feature for a sample region of an image. The Haar-like feature may be computed based on summation values corresponding to a level in the hierarchy of sums that most closely approximates the area for which a sum is desired, as described with reference to FIG. 5, above.

It should be appreciated that the specific steps illustrated in FIG. 7 provide a particular method updating and/or using a hierarchy of sums, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 7 may include multiple sub-steps that may be performed in various sequences as appropriate to the individual step. Furthermore, additional steps/blocks may be added or removed depending on the particular applications. One of ordinary skill in the art would recognize and appreciate many variations and modifications.

Figure 8:
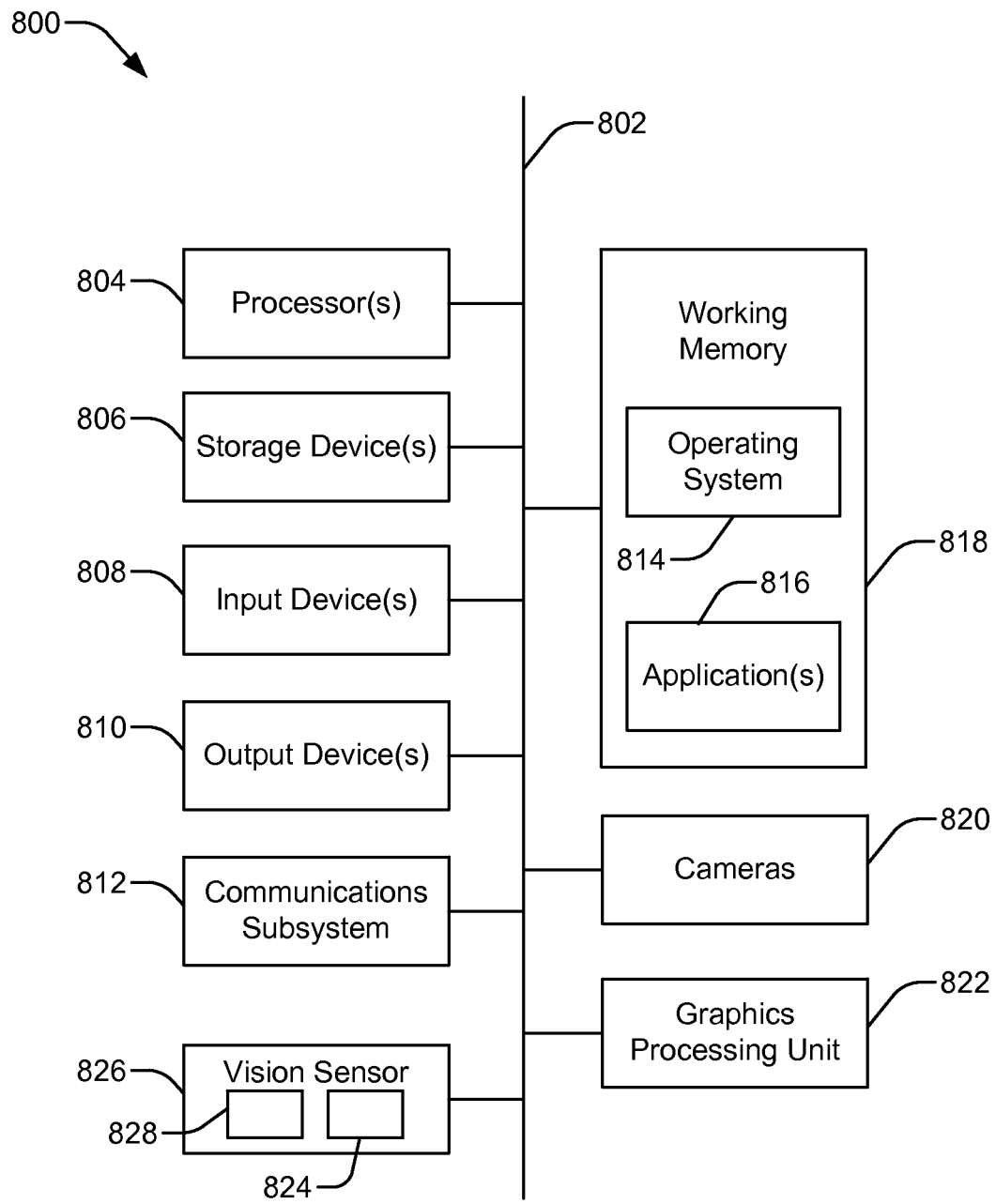
FIG. 8 illustrates an example of a computing system in which one or more embodiments may be implemented.

FIG. 8 illustrates an example of a computing system in which one or more embodiments may be implemented.

A computing system as illustrated in FIG. 8 may be incorporated as part of the above described computerized device. For example, computing system 800 can represent some of the components of a television, a computing device, a server, a desktop, a workstation, a control or interaction system in an automobile, a tablet, a netbook, mobile device or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 8 provides a schematic illustration of one implementation of a computing system 800 that can perform the methods provided by various other implementations, as described herein, and/or can function as the host computing system, a remote kiosk/terminal, a point-of-sale device, a telephonic or navigation or multimedia interface in an automobile, a computing device, a set-top box, a table computer and/or a computing system. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computing system 800 is shown comprising hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics processing units 822, dedicated micro-processor 824 for a vision sensor 826, and/or the like); one or more input devices 808, which can include without limitation one or more cameras, sensors, a mouse, a keyboard, a microphone configured to detect ultrasound or other sounds, and/or the like; and one or more output devices 810, which can include without limitation a display unit such as the device used in implementations of the invention, a printer and/or the like. Additional cameras 820 may be employed for detection of user's extremities and gestures. In some implementations, input devices 808 may include one or more sensors such as infrared, depth, and/or ultrasound sensors. The computing system 800 may also include a vision sensor 826 that may include a pixel array 828 and a dedicated microprocessor 824. The dedicated microprocessor 824 may perform the computations described above, such as computing and storing the hierarchy of computations. Similarly, the vision sensor 826 may include peripheral circuitry such as analog or digital computational blocks, memory blocks and/or scanning windows that may be involved in the implementation of the hierarchy of computations described elsewhere herein and may be electronically disposed between the pixel array 828 and the dedicated microprocessor 824. Computation of, and use of for computer vision feature computation, the hierarchy of computations may therefore reside in the dedicated microprocessor 824, or the peripheral circuitry, or may be distributed between the two. It is understood that the computations described above may also be performed in processor(s) 800 of computing system 800.

In some of the implementations of the invention, various input devices 808 and output devices 810 may be embedded into interfaces such as display devices, tables, floors, walls, and window screens. Furthermore, input devices 808 and output devices 810 coupled to the processors may form multi-dimensional tracking systems.

The computing system 800 may further include (and/or be in communication with) one or more non-transitory storage devices 806, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computing system 800 might also include a communications subsystem 812, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 812 may permit data to be exchanged with a network, other computing systems, and/or any other devices described herein. In many implementations, the computing system 800 will further comprise a non-transitory working memory 818, which can include a RAM or ROM device, as described above.

The computing system 800 also can comprise software elements, shown as being currently located within the working memory 818, including an operating system 814, device drivers, executable libraries, and/or other code, such as one or more application programs 816, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods, including, for example, the methods described in any of the preceding figures.

A set of these instructions and/or code might be stored on a computer-readable storage medium, such as the storage device(s) 806 described above. In some cases, the storage medium might be incorporated within a computing system, such as computing system 800. In other implementations, the storage medium might be separate from a computing system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computing system 800 and/or might take the form of source and/or installable code, which, upon compilation and/or installation on the computing system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computing system 800 may be omitted or may be implemented separate from the illustrated system. For example, the processor 804 and/or other elements may be implemented separate from the input device 808. In one implementation, the processor may be configured to receive images from one or more cameras that are separately implemented. In some implementations, elements in addition to those illustrated in FIG. 8 may be included in the computing system 800.

Some implementations may employ a computing system (such as the computing system 800) to perform methods in accordance with the disclosure, for example the methods described in FIGS. 5A and 5B as well as techniques described with reference to FIGS. 3A-3D and 4A-4D. For example, some or all of the procedures of the described methods may be performed by the computing system 800 in response to processor 804 executing one or more sequences of one or more instructions (which might be incorporated into the operating system 814 and/or other code, such as an application program 816) contained in the working memory 818. In some implementations, processor 804 may perform the computations described above, such as computing and storing the hierarchy of computations. Such instructions may be read into the working memory 818 from another computer-readable medium, such as one or more of the storage device(s) 806. Merely by way of example, execution of the sequences of instructions contained in the working memory 818 might cause the processor(s) 804 to perform one or more procedures of the methods described herein.

The terms "machine-readable medium" and "computer-readable medium," as used herein, refer to any medium that participates in providing data that causes a machine to operate in a specific fashion. In some implementations implemented using the computing system 800, various computer-readable media might be involved in providing instructions/code to processor(s) 804 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 806. Volatile media include, without limitation, dynamic memory, such as the working memory 818. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing system 800. These signals, which might be in the form of electromagnetic signals, acoustic signals, optical signals and/or the like, are all examples of carrier waves on which instructions can be encoded, in accordance with various implementations of the invention.

The communications subsystem 812 (and/or components thereof) generally will receive the signals, and the bus 802 then might carry the signals (and/or the data, instructions, etc. carried by the signals) to the working memory 818, from which the processor(s) 804 retrieves and executes the instructions. The instructions received by the working memory 818 may optionally be stored on a non-transitory storage device 806 either before or after execution by the processor(s) 804.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

What is claimed is:

1. A computing system for determining computer vision features, comprising:
    a vision sensor comprising a plurality of pixels, the plurality of pixels arranged along at least a first dimension and a second dimension of a pixel array, each of the plurality of pixels capable of generating a signal based on light incident upon the respective pixel from the plurality of pixels;
    hierarchical computation generation hardware coupled to the vision sensor and a memory buffer, and configured to maintain a representation of the plurality of pixels of the pixel array as a hierarchy of computations in the memory buffer, each level above a lower level of the hierarchy of computations comprising one or more values representing a computation based on values from the lower level of the hierarchy and each value of the one or more values of each level of the hierarchy of computations being associated with a region in an image captured by the pixel array, and the one or more values for the each level representing the entire image captured by the pixel array;
    the hierarchical computation generation hardware further configured to update levels of the hierarchy of computations above a given level based on a new value at the given level only if the new value differs from a previous value by an amount greater than a reference threshold and not updating the levels of the hierarchy of computations above the given level if there is no value among values of the given level that has changed greater than the reference threshold; and
    computer vision feature computation hardware configured to compute a computer vision feature based on the updated hierarchy of computations.

2. The computing system of claim 1, wherein the new value is accompanied by an event indicating that one or more values at the given level have changed beyond the reference threshold.

3. The computing system of claim 2, wherein the given level is a pixel level and the event comprises detecting a change in a voltage level caused by the change in a sensing environment at the pixel beyond a reference voltage threshold.

4. The computing system of claim 1, wherein the hierarchy of computations comprises a hierarchy of sums wherein each level above the lower level of the hierarchy of sums comprises one or more values representing a weighted summation of values from the lower level of the hierarchy and wherein the hierarchy of sums is used for computing a Haar-like feature for a sample region of the image.

5. The computing system of claim 4, wherein the Haar-like feature is computed based on a summation value corresponding to a level in the hierarchy of sums that most closely approximates the sample region of the image.

6. The computing system of claim 5, wherein the level in the hierarchy of sums that most closely approximates the sample region of the image to be summed comprises the level associated with largest region in the image bounded by a sub-region of the sample region of the image.

7. The computing system of claim 1, wherein the computation based on the values from the lower level of the hierarchy for the level above the lower level is one of a simple sum, a weighted sum, or an average.

8. The computing system of claim 1, wherein the computation based on the values from the lower level of the hierarchy for the level above the lower level is a computer vision computation.

9. The computing system of claim 1, wherein updating the levels of the hierarchy of computations above the given level comprises only updating some of the values in each of the levels of the hierarchy of computations above the given level.

10. A method, comprising:
    representing values from two or more pixels of a pixel array as a hierarchy of computations, each level above a lower level of the hierarchy of computations comprising one or more values representing a computation based on values from the lower level of the hierarchy and each value of the one or more values of each level of the hierarchy of computations being associated with a region in an image captured by the pixel array, wherein each pixel of the pixel array comprises a sensory element capable of generating a sensor reading based on environmental conditions, and the one or more values for the each level representing the entire image captured by the pixel array;
    updating levels of the hierarchy of computations above a given level based on a new value at the given level only if the new value differs from a previous value by an amount greater than a reference threshold and not updating the levels of the hierarchy of computations above the given level if there is no value among values of the given level that has changed greater than the reference threshold; and
    computing a computer vision features based on the updated hierarchy of computations.

11. The method of claim 10, wherein the new value is accompanied by an event indicating that one or more values at the given level have changed beyond the reference threshold.

12. The method of claim 11, wherein the given level is a pixel level and the event comprises detecting a change in a voltage level caused by the change in a sensing environment at the pixel beyond a reference voltage threshold.

13. The method of claim 10, wherein the hierarchy of computations comprises a hierarchy of sums wherein each level above the lower level of the hierarchy of sums comprises one or more values representing a weighted summation of values from the lower level of the hierarchy and wherein the hierarchy of sums is used for computing a Haar-like feature for a sample region of the image.

14. The method of claim 13, wherein the Haar-like feature is computed based on a summation value corresponding to a level in the hierarchy of sums that most closely approximates the sample region of the image.

15. The method of claim 14, wherein the level in the hierarchy of sums that most closely approximates an area to be summed comprises the level associated with largest region in the image bounded by a sub-region of the sample region of the image.

16. The method of claim 10, wherein the pixel array is a two dimensional array.

17. The method of claim 10, wherein the computation based on the values from the lower level of the hierarchy for the level above the lower level is one of a simple sum, a weighted sum, or an average.

18. The method of claim 10, wherein the computation based on the values from the lower level of the hierarchy for the level above the lower level is a computer vision computation.

19. The method of claim 10, wherein updating the levels of the hierarchy of computations above the given level comprises only updating some of the values in each of the levels of the hierarchy of computations above the given level.

20. An apparatus, comprising:
means for representing values from two or more pixels of a pixel array as a hierarchy of computations, each level above a lower level of the hierarchy of computations comprising one or more values representing a computation based on values from the lower level of the hierarchy and each value of the one or more values of each level of the hierarchy of computations being associated with a region in an image captured by the pixel array, wherein each pixel of the pixel array comprises a sensory element capable of generating a sensor reading based on environmental conditions, and the one or more values for the each level representing the entire image captured by the pixel array;
means for updating levels of the hierarchy of computations above a given level based on a new value at the given level only if the new value differs from a previous value by an amount greater than a reference threshold and not updating the levels of the hierarchy of computations above the given level if there is no value among values of the given level that has changed greater than the reference threshold; and
means for computing a computer vision features based on the updated hierarchy of computations.

21. he apparatus of claim 20, wherein the new value is accompanied by an event indicating that one or more values at the given level have changed beyond the reference threshold.

22. The apparatus of claim 21, wherein the given level is a pixel level and the event comprises detecting a change in a voltage level caused by the change in a sensing environment at the pixel beyond a reference voltage threshold.

23. The apparatus of claim 20, wherein the hierarchy of computations comprises a hierarchy of sums wherein each level above the lower level of the hierarchy of sums comprises one or more values representing a weighted summation of values from the lower level of the hierarchy and wherein the hierarchy of sums is used for computing a Haar-like feature for a sample region of the image.

24. The apparatus of claim 23, wherein the Haar-like feature is computed based on a summation value corresponding to a level in the hierarchy of sums that most closely approximates the sample region of the image.

25. The apparatus of claim 24, wherein the level in the hierarchy of sums that most closely approximates an area to be summed comprises the level associated with largest region in the image bounded by a sub-region of the sample region of the image.

26. The apparatus of claim 20, wherein the pixel array is a two dimensional array.

27. The apparatus of claim 20, wherein the computation based on the values from the lower level of the hierarchy for the level above the lower level is one of a simple sum, a weighted sum, or an average.

28. A non-transitory computer-readable storage medium, wherein the non-transitory computer-readable storage medium comprises instructions executable by a processor for:
representing values from two or more pixels of a pixel array as a hierarchy of computations, each level above a lower level of the hierarchy of computations comprising one or more values representing a computation based on values from the lower level of the hierarchy and each value of the one or more values of each level of the hierarchy of computations being associated with a region in an image captured by the pixel array, wherein each pixel of the pixel array comprises a sensory element capable of generating a sensor reading based on environmental conditions, and the one or more values for the each level representing the entire image captured by the pixel array;
updating levels of the hierarchy of computations above a given level based on a new value at the given level only if the new value differs from a previous value by an amount greater than a reference threshold and not updating the levels of the hierarchy of computations above the given level if there is no value among values of the given level that has changed greater than the reference threshold; and
computing a computer vision features based on the updated hierarchy of computations.

29. The non-transitory computer-readable storage medium of claim 28, wherein the hierarchy of computations comprises a hierarchy of sums wherein each level above the lower level of the hierarchy of sums comprises one or more values representing a weighted summation of values from the lower level of the hierarchy and wherein the hierarchy of sums is used for computing a Haar-like feature for a sample region of the image.

30. The non-transitory computer-readable storage medium of claim 29, wherein the Haar-like feature is computed based on a summation value corresponding to a level in the hierarchy of sums that most closely approximates the sample region of the image.

* * * * *